United States Patent Office 3,116,324
Patented Dec. 31, 1963

3,116,324
PREPARATION OF ORTHO-PHENETHYLBENZOIC ACIDS BY HYDROGENATION OF 3-BENZALPHTHALIDES
Morris A. Dolliver, Edison, N.J., assignor to Olin Mathieson Chemical Corporation, New York, N.Y., a corporation of Virginia
No Drawing. Filed June 19, 1961, Ser. No. 117,852
5 Claims. (Cl. 260—515)

This invention relates to an improved process for preparing o-phenethylbenzoic acids and more particularly to an improved process for converting 3-benzalphthalides to o-phenethylbenzoic acids.

o-Phenethylbenzoic acids are useful intermediates in the preparation of 10,11-dihydro-5H-dibenzo[a,d]cyclohepten-5-ones, which are known compounds, themselves useful as intermediates in the preparation of the corresponding 5 - dialkylaminoalkoxy - 10,11 - dihydro - 5H-dibenzo[a,d]cycloheptene and 5 - (dialkylaminoalkylidene)-10,11-dihydro-5H-dibenzo[a,d]cycloheptene derivatives. Prior to this invention, however, there was no known method for the preparation of o-phenethylbenzoic acids by the direct hydrogenation of 3-benzalphthalides.

It has now been found that such direct hydrogenation can be accomplished if an activated form of nickel, such as Raney nickel or sponge nickel, is employed as a catalyst and the reaction is conducted at a temperature below about 40° C. This discovery is unexpected since if known hydrogenation catalysts such as platinum and palladium are used, the desired product is not obtained. Moreover, it has been found that by the practice of this invention, the desired hydrogenation can be achieved at a relatively lower pressure of hydrogen.

It is an object of this invention, therefore, to provide a low pressure one-step process for reducing 3-benzalphthalides to o-phenethylbenzoic acids.

This object is achieved by the process of this invention, which essentially comprises interacting a 3-benzalphthalide with hydrogen in the presence of an activated nickel catalyst at a temperature below about 40° C. This process may be represented by the following equation:

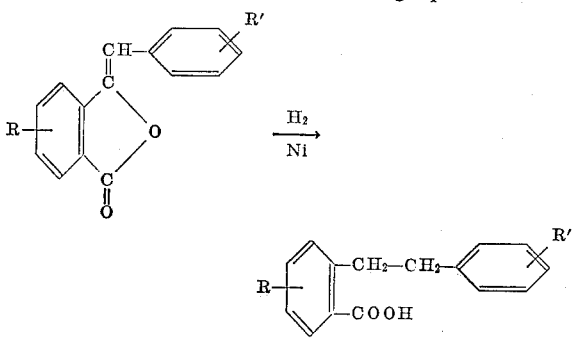

wherein R and R' are the same or different and represent hydrogen, halogen, lower alkyl, lower alkoxy or trifluoromethyl.

Among the suitable benzalphthalide reactants may be mentioned: 3-benzalphthalide; halo-3-benzalphthalides, such as 4-chloro-3-benzalphthalide, 5-bromo-3-benzalphthadile, 6-fluoro-3-benzalphthalide, 6-chloro-3-benzalphthalide, 7-chloro-3-benzalphthalide, 3-o-chlorobenzalphthalide, 3-m-bromobenzalphthalide, 3-perchlorobenzalphthalide, 3-p-fluorobenzalphthalide, and 6-chloro-3-p-chlorobenzalphthalide; (lower alkyl)-3-benzalphthalides, such as 4-(lower alkyl)-3-benzalphthalides (e.g., 4-methyl-3-benzalphthalide and 4-ethyl-3-benzalphthalide), 5-(lower alkyl)-3-benzalphthalides (e.g., 5-methyl-3-benzalphthalide and 5-isopropyl-3-benzalphthalide), 6-(lower alkyl)-3-benzalphthalides (e.g., 6-methyl-3-benzalphthalide and 6-n-hexyl-3-benzalphthalide), 7-(lower alkyl)-3-benzalphthalides (e.g., 7-methyl-3-benzalphthalide), 3-o-(lower alkyl)-benzalphthalides (e.g., 3-o-methylbenzalphthalide and 3-o-ethylbenzalphthalide), 3-m-(lower alkyl)benzalphthalides (e.g., 3-m-methylbenzalphthalide and 3-m-n-butylbenzalphthalide), and 3-p-(lower alkyl)benzalphthalides (e.g., 3-p-methylbenzalphthalide and 3-p-n-hexylbenzalphthalide; (lower alkoxy)-3-benzalphthalides, such as 4-(lower alkoxy)-3-benzalphthalides (e.g., 4-methoxy-3-benzalphthalide and 4-ethoxy-3-benzalphthalide), 5-(lower alkoxy)-3-benzalphthalides (e.g., 5-methoxy-3-benzalphthalide and 5-isopropoxy-3-benzalphthalide), 6-(lower alkoxy)-3-benzalphthalides (e.g., 6-methoxy-3-benzalphthalide and 6-n-hexyloxy-3-benzalphthalide), 7-(lower alkoxy)-3-benzalphthalides (e.g., 7-methoxy-3-benzalphthalide), 3-o-(lower alkoxy)-benzalphthalides (e.g., 3-o-methoxybenzalphthalide and 3-o-ethoxybenzalphthalide), 3-m-(lower alkoxy)benzalphthalides (e.g., 3-m-methoxybenzalphthalide and 3-m-n-butoxybenzalphthalide), and 3-p-(lower alkoxy)benzalphthalides (e.g., 3-p-methoxybenzalphthalide and 3-p-ethoxybenzalphthalide); and (trifluoromethyl)-3-benzalphthalides, such as 4-trifluoromethyl-3-benzalphthalide, 5-trifluoromethyl - 3 - benzalphthalide, 6 - trifluoromethyl-3-benzalphthalide, 7-trifluoromethyl-3-benzalphthalide, 3-o - (trifluoromethyl) - benzalphthalide, 3 - m - (trifluoromethyl)benzalphthalide and 3-p-(trifluoromethyl)benzalphthalide.

In those instances where the 3-benzalphthalides are new compounds they can be prepared by reacting a suitably substituted R-phthalic anhydride with a suitably substituted R'-phenylacetic acid. If a substituted phthalic anhydride is used as the reactant the position of the substituent on the resulting benzalphthalide will depend on the position of the substituent on the phthalic anhydride. Thus, where an ortho substituted phthalic anhydride is condensed with phenylacetic acid a mixture of 4- and 7-substituted 3-benzalphthalides is obtained. These benzalphthalides yield a mixture of phenethylbenzoic acids, which are then separated by fractional crystallization.

The hydrogenation process of this invention is preferably conducted in an organic solvent for the benzalphthalide reactant. Although any such solvent can be used, the preferred solvents are lower alkanols, such as ethanol, and lower alkyl lower alkanoates, such as methyl acetate and ethyl acetate.

The reaction is conducted in the presence of an activated form of nickel, such as Raney nickel or sponge nickel. As stated hereinbefore, the temperature of the reaction must be kept below about 40° C. and for convenience the reaction is preferably conducted at room temperature. Although a hydrogen pressure as low as atmospheric pressure is operative, the preferred hydrogen pressure is in the range of about 20 p.s.i.g. (pounds per square inch gauge) to about 50 p.s.i.g.; optimally about 30 p.s.i.g. to about 50 p.s.i.g.

The following examples illustrate the invention:

EXAMPLE 1 o-Phenethylbenzoic Acid (a) Preparation of 3-benzalphthalide: A mixture of 200 g. of phthalic anhydride, 220 g. of phenyl acetic acid and 5.2 g. of anhydrous sodium acetate is heated at 240–243° C. until no more water distills off. The reaction mixture is cooled to 90° C. and recrystallized from 700 ml. of ethanol. Yield about 245 g.; M.P. about 99.5–101° C.

(b) Preparation of o-phenethylbenzoic acid: 8.8 g. of 3-benzalphthalide is dissolved in 240 ml. of ethyl alcohol and hydrogenated over 10 g. of alcohol wet sponge nickel at room temperature at an initial hydrogen pressure of 50 p.s.i.g. At the end of seven hours the hydrogen uptake is essentially theoretical as calculated from the pressure drop. The catalyst is then removed by filtration and the product obtained from the filtrate by concentration and crystallization from ethyl alcohol. The yield of crude o-phenethylbenzoic acid is about 8.2 g., M.P. about 120–127° C. Recrystallization from alcohol gives about 7.3 g. of product, M.P. about 129–131° C.

EXAMPLE 2

Following the procedure of Example 1 but substituting ethyl acetate for the ethyl alcohol, the same product is obtained.

By way of contrast, if the procedure of Example 2 is conducted at 50° C., rather than room temperature, a mixture of products melting over a temperature range of 65–100° C. is obtained. Similarly, by conducting the procedure of Example 1 at 50° C. a mixture of products melting over a temperature range of 82–123° C. is obtained. Moveover, if 5% palladium on alumina or 5% platinum on alumina is substituted for the sponge nickel catalyst in the procedures of Example 1 or 2, no o-phenethylbenzoic acid is obtained.

EXAMPLE 3

2-Phenethyl - 3 - Chlorobenzoic Acid and 2-Phenethyl-6-Chlorobenzoic Acid

Following the procedure of Example 1 but substituting an equivalent amount of 3-chlorophthalic anhydride for the phthalic anhydride in step *a*, there is obtained a mixture of 2-phenethyl - 3 - chlorobenzoic acid and 2-phenethyl-6-chlorobenzoic acid which may be separated by fractional recrystallization.

EXAMPLE 4

2-(p-Chlorophenethyl)Benzoic Acid

Following the procedure of Example 1, but substituting an equivalent amount of p-chlorophenylacetic acid for the phenylacetic acid in step *a*, 2-(p-chlorophenethyl)benzoic acid is obtained.

EXAMPLE 5

2-Phenethyl-4-Ethoxybenzoic Acid and 2-Phenethyl-5-Ethoxybenzoic Acid

Following the procedure of Example 1, but substituting an equivalent amount of 4-ethoxyphthalic anhydride for the phthalic anhydride in step *a*, there is obtained a mixture of 2-phenethyl - 4 - ethoxybenzoic acid and 2-phenethyl-5-ethoxybenzoic acid which may be separated by the procedure of Example 3.

EXAMPLE 6

2-(m-Trifluoromethylphenethyl)Benzoic Acid

Following the procedure of Example 1, but substituting an equivalent amount of m-trifluoromethylphenylacetic acid for the phenylacetic acid in step *a*, 2-(m-trifluoromethylphenethyl)benzoic acid is obtained.

m-Trifluoromethylphenylacetic acid is prepared by treating the Grignard reagent prepared from m-trifluoromethylbenzyl bromide with carbon dioxide. m-Trifluoromethylbenzyl bromide is prepared by the reduction of m-trifluoromethylbenzoic acid and conversion of the alcohol thus formed to m-trifluoromethylbenzyl bromide by reaction with phosphorus tribromide.

EXAMPLE 7

2-(o-Tolylethyl)-4-Fluorobenzoic Acid and 2-(o-Tolylethyl)-5-Fluorobenzoic Acid Following the procedure of Example 1, but substituting an equivalent amount of 4-fluorophthalic anhydride for the phthalic anhydride and an equivalent amount of o-tolylacetic acid for the phenylacetic acid in step *a*, there is obtained a mixture of 2-(o-tolylethyl)-4-fluorobenzoic acid and 2-(o-tolylethyl)-5-fluorobenzoic acid, which may be separated by the procedure of Example 3.

The invention may be variously otherwise embodied within the scope of the appended claims.

What is claimed is:

1. A process for preparing an o-phenethylbenzoic acid of the formula

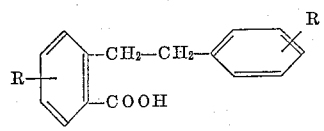

wherein each R is selected from the group consisting of hydrogen, halogen, lower alkyl, lower alkoxy and trifluoromethyl, which consists of interacting a 3-benzalphthalide of the formula

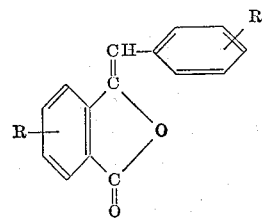

wherein each R is as hereinbefore defined, with hydrogen in the presence of an activated nickel catalyst at a temperature below about 40° C.

2. The process of claim 1 wherein the nickel catalyst is sponge nickel.

3. A process for preparing o-phenethylbenzoic acid, which consists of interacting 3-benzalphthalide with hydrogen in the presence of a sponge nickel catalyst at a temperature below about 40° C.

4. The process of claim 3 wherein the reaction is conducted under a hydrogen pressure in the range of about atmospheric pressure to about 50 pounds per square inch gauge.

5. The process of claim 4 wherein the reaction is conducted in an organic solvent selected from the group consisting of lower alkanols and lower alkyl lower alkanoates at room temperature.

References Cited in the file of this patent

Berti: "Gazz. Chim. Ital.," vol. 86 (1956) pp. 883–892.
Berti: "Gazz. Chim. Ital.," vol. 87, (1957) pp. 707–719.